Oct. 9, 1951 — G. M. ACTON — 2,570,300
PORTABLE COOLER
Filed Oct. 1, 1947 — 2 Sheets-Sheet 1

Inventor
Grant M. Acton
By Fishburn & Mullendore
Attorneys

Oct. 9, 1951        G. M. ACTON        2,570,300
PORTABLE COOLER
Filed Oct. 1, 1947        2 Sheets-Sheet 2
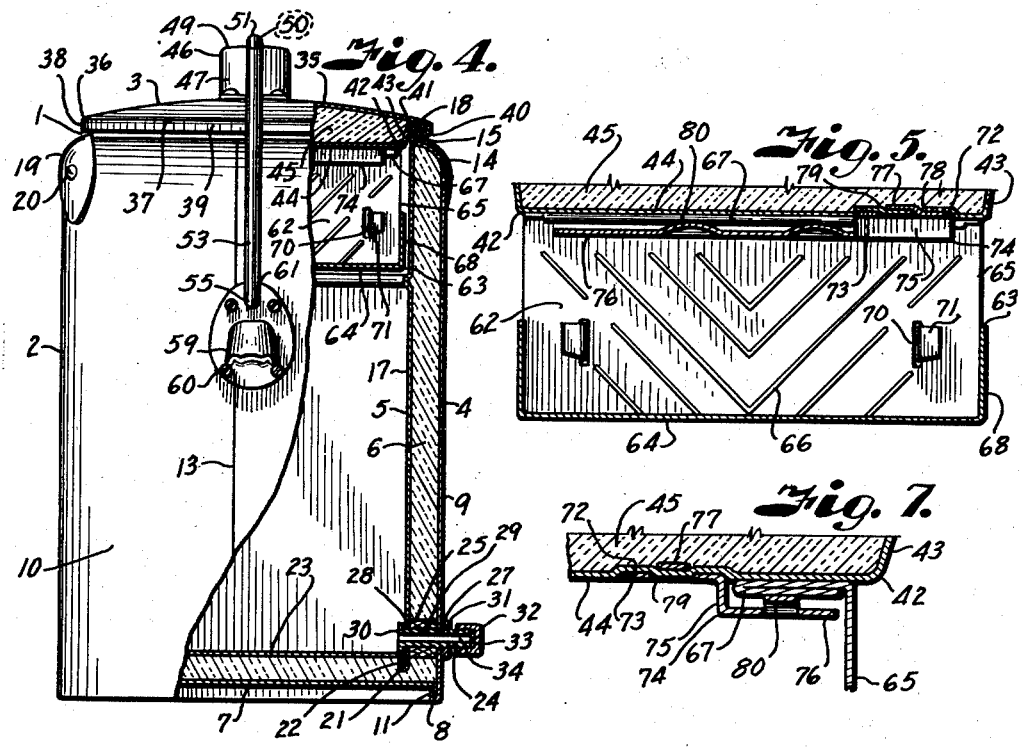
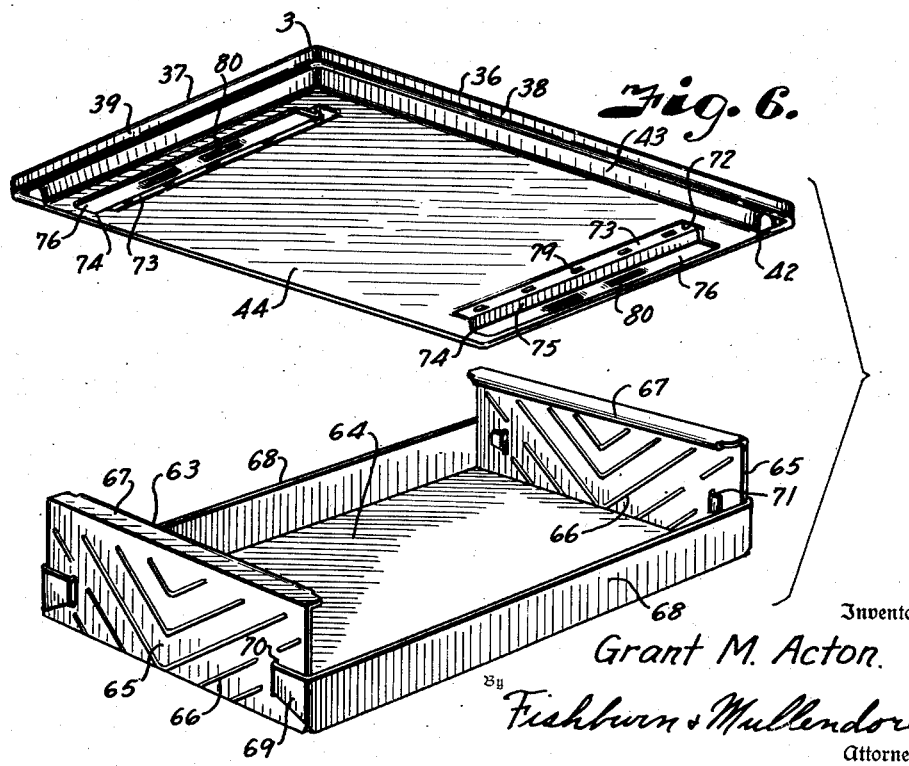
Inventor
Grant M. Acton
By Fishburn & Mullendore
Attorneys

UNITED STATES PATENT OFFICE 2,570,300

PORTABLE COOLER

Grant M. Acton, Arkansas City, Kans., assignor to Acton Manufacturing Company, Inc., a corporation of Kansas Application October 1, 1947, Serial No. 777,213

1 Claim. (Cl. 62—63)

This invention relates to portable coolers and more particularly to such a cooler or ice chest for use on picnics, trips and other instances where refrigeration is desirable to chill beverages and foods.

The objects of the present invention are to provide a portable cooler having heavily insulated walls, bottom and removable cover; to provide a portable cooler, the walls of which include an inner liner forming a watertight ice container in the lower portion thereof and having a closeable drain; to provide an insulated cover structure having edges adapted to fit over and sealingly engage an upstanding rim on the cooler box; to provide a cover with a handle by which said cover may be picked up or removed from the cooler, said handle including a seat to receive the central portion of a bail that is pivotally carried by the end walls of the cooler and provide the downward pressure on the handle and cover to tightly retain said cover in sealing engagement on the cooler box; to provide a food container for insertion into the cooler box; to provide for removably supporting the food container on the cover whereby removal of the cover removes said food container from the cooler box to provide access to the interior thereof; to provide a cooler with a food tray or container which is readily accessible to the user and is slidaby carried on the under side of the cover with friction means for preventing said container from slipping or moving by itself while the cooler is being transported or the cover being removed for access to the food or beverages contained in the cooler; to provide a reinforced food container of light weight, yet rigid structure, capable of retaining its shape under rough usage; and to provide a portable cooler of the character described that is neat and attractive in appearance, durable, and sturdily built to withstand rough treatment instant to transportation abuses, yet is inexpensive, light in weight, and convenient to use.

In accomplishing these and other objects of the present invention, I have provided improved details of structure, the preferred forms of which are illustrated in the accompanying drawings, wherein:

Fig. 4 is an end elevation of the cooler, portions being broken away to better illustrate the structure of the various parts.

Fig. 5 is a transverse sectional view through the food compartment and a portion of the cover illustrating the mounting of the food compartment on said cover.

Fig. 6 is a disassembled, perspective view of the cover and food tray.

Fig. 7 is an enlarged sectional view through the mounting of the food tray on the cover, particularly illustrating the fastening of the food tray tracks to the cover.

Figure 1:
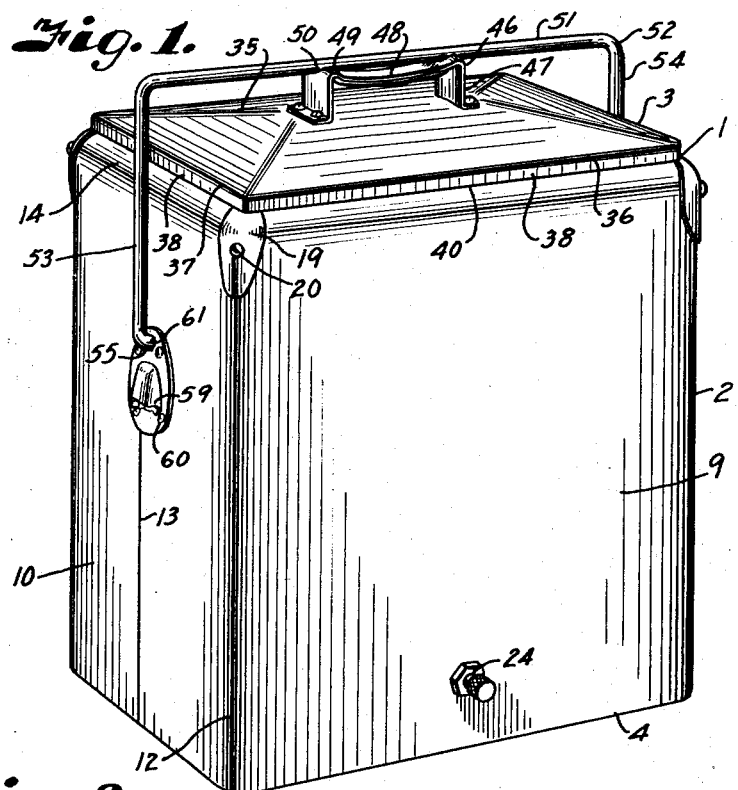
Fig. 1 is a perspective view of a portable cooler embodying the features of the present invention.

Referring more in detail to the drawings:

1 designates a portable food and beverage cooler consisting of a cooler box 2 and cover 3 therefor. The cooler box preferably consists of spaced outer and inner shells 4 and 5 respectively, preferably of sheet metal, the inner shell being of corrosion resistant material such as stainless steel, aluminum, or steel coated with anti-corrosion material. Space between the shells is preferably filled with suitable insulation 6 to reduce the transfer of heat through the walls of the cooler. The outer shell preferably consists of a bottom 7 having downwardly turned edges 8, seating between side and end walls 9 and 10 and upturned lower edges 11 thereon to form a lock joint between the walls 9 and 10 and the bottom 7.

To facilitate manufacturing, the vertical walls 9 and 10 of the outer shell 4 are preferably formed of two pieces shaped to form rounded corners 12, the vertical edges of each of the pieces being lapped as at 13 to form the end walls 10, the lapped portions preferably being spot welded and the inner edges covered with a suitable waterproof sealing material. The upper portions of the side and end walls 9 and 10 are curved inwardly as at 14 and the upper edge 15 turned upwardly to lie against the outer surface of the side and end walls 16 and 17 of the inner shell 5, the upper edges of said inner walls 16 and 17 being turned outwardly and downwardly as at 18 over the upstanding edge 15 of the walls of the outer shell to form a lock joint around the upper portion of the walls of the cooler and an upstanding ridge to receive the cover 3, as later described. The upper corners of the outer shell are covered with metal corner pieces 19 suitably secured in place as by screws 20, said cover pieces cooperating with the curved upper portion of the outer shell and the lock joint to close the upper end of the space for the insulation between the inner and outer shells. The lower edges of the inner walls 16 and 17 are turned upwardly as at 21 to receive downturned edges 22 of the bottom 23 of said inner shell to form a lock joint between said inner walls 16 and 17 and the bottom 23. Said lock joints are spot welded together and soldered to make the joint substantial and watertight.

Figure 2:
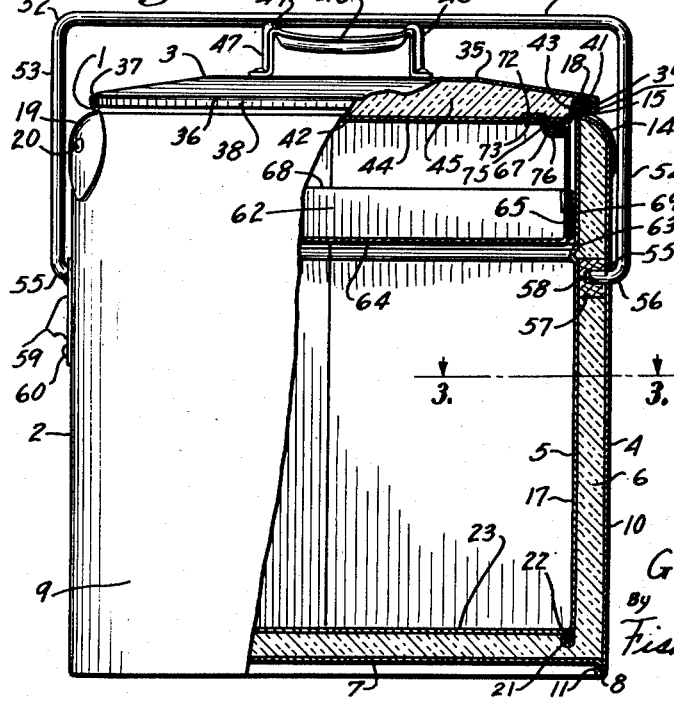
Fig. 2 is a side elevation of the cooler box with the cover and food compartment arranged in cooler closing position, a portion of the cooler being broken away to better illustrate the structure and location of the various portions of the cooler.
Figure 3:
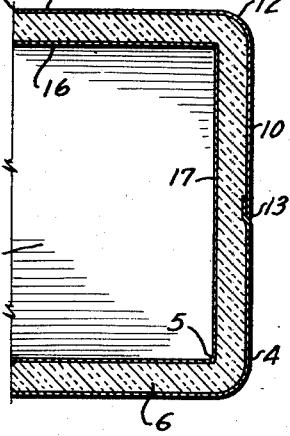
Fig. 3 is a horizontal sectional view through the cooler box on the line 3—3, Fig. 2.

As shown in Fig. 2, the bottom 23 is spaced from the bottom 7 of the outer shell whereby the insulation is arranged across the bottom of the cooler to fill said space to reduce heat transfer between said bottoms, said insulation providing added support for the walls and bottom of the inner and outer shells to provide a more rigid construction, reducing distortion due to weight of the ice and bottled beverages or the like adapted to be placed and carried in the cooler box.

The cooler box is preferably provided with a tubular drain 24 located adjacent the bottom of the inner shell and passing through the two shell walls 16 and 9. In order to support the walls adjacent the drain, a block of wood or other suitable material 25 is preferably placed between the inner and outer shells with suitable waterproofing material or adhesive sealing the points of contact of said block and the walls. The drain fitting preferably consists of a tubular member extending through openings 27 and 28 in the walls 19 and 16 respectively, and an opening 29 in the block 25. The inner end of the tubular member is provided with a head 30 that bears against a suitable seal, such as a lead gasket or the like, between the head and the inside face of the wall. The outer end of the tubular member 24 is preferably provided with threads to receive a nut 31 which is threaded on the tube and bears against the outside surface of the wall 9 to pull the head against the gasket and compress same against the inner wall 16 to form a watertight joint therebetween. The outer end of the tube is also provided with a cap 32, preferably having a suitable gasket 33 therein adapted to bear against the outer end of the drain tube to seal the passage 34 therein when the cap 32 is threaded on the end of the tube.

The cooler cover is preferably formed of an outer member 35 shaped to form a crowned appearance, the sides and ends being turned downwardly as at 36 and 37 to form side and end edges 38 and 39 of the cover, the lower portion of the sides and ends of the cover being turned upwardly as at 40 forming a channel therearound in which is snugly received curved upper edges 41 of an inner liner 42. The curved edges 41 of the inner liner 42 engage the inner surfaces of the outer member 35 and have inwardly directed sloping walls 43 terminating in a flat portion 44 spaced from the outer member 35, said spacing being filled with insulating material 45. The inwardly sloping edges of the cover inner liner are of such size that the lower portion of the liner freely fits into the opening surrounded by the upstanding rib formed by the upper edges of the inner shell 5, and the upper portion of the liner member is slightly larger than the inner dimensions of the rib, whereby the sloping portions engage said rib to form a seal for closing the open upper end of the cooler box, while the lower portion of the sides and ends 38 and 39 of the cover are spaced from the upper rounded end of the outer shell 4.

The outer member 35 of the cooler cover is preferably provided with a handle 46, the ends 47 of which are turned downwardly and outwardly to rest on the outer member 35, said ends being suitably secured by screws or the like to provide a secure solid mounting of the handle on the outer member 35. The intermediate handle portion between the downturned ends is slightly concave longitudinally as indicated at 48 to provide a sheet metal handle portion shaped to comfortably fit the hand while carrying the cooler. The upper edges of the handle adjacent the ends thereof are preferably curved as at 49 and provided with a seat 50 to receive the central portion 51 of a bail 52, the ends or legs 53 and 54 of said bail being parallel and positioned close to the end walls 10 of the cooler box. The lower ends 55 of the legs 53 and 54 are turned inwardly toward each other and are pivotally seated in holes 56 in said end walls. To reinforce the inner and outer shells adjacent the pivotal connection of the bail, a block 57 of wood or other suitable material is secured to the walls 10 and 17 by suitable adhesive or the like, said block having holes 58 aligning with the holes 56 to receive the ends 55 of the bail.

The bail is adapted for a swinging movement to engage the curved portion 49 of the handle and spring upwardly over the edge thereon and drop or spring into the seat 50 to tightly hold the cooler cover in place on the cooler box. Mounted on one end of the cooler box is a bottle opener 59 preferably secured to the outer shell 4 by screws or other suitable fastening devices 60. The bottle opener preferably is placed adjacent the pivot point of the bail and is provided with an aperture 61 therein giving additional support to the wall 10 around the opening 56 for the pivotal mounting of the bail.

A food compartment 62 is formed in the upper portion of the cooler whereby food may be supported above the bottled beverages and ice contained in the lower portion of the cooler. The cooler compartment is formed by a tray 63 preferably removably supported on the lower portion of the cover whereby the tray is removed from the cooler box with the cover to provide access to the lower portion of said cooler box, said tray being removable from the cover to provide access to the food carried in the tray. The tray is of such size that it will easily slip within the boundary of the inside walls of the inner shell 5 and preferably consists of a bottom 64 having upturned ends 65 suitably reinforced as by indented ribs 66. The upper edges of the end walls 65 are turned inwardly toward each other to form horizontal suspension flanges 67 for the tray. The inner ends of said flanges are preferably bent downwardly and rearwardly to form a double thickness for said flanges and a rounded inner edge thereon. The sides of the tray are preferably turned upwardly to form side walls 68, preferaby shorter in height than the end walls 65, the ends of said side walls being suitably secured to the said end walls to form a rigid structure as by bending tabs 69 on said side walls around the outer surface of the end walls and inwardly through slots 70 in said end walls and backwardly as at 71 into engagement with the inner face of the end walls to lap the ends of the side walls and provide a rigid structure capable of supporting considerable weight on the tray.

The under side of the cover liner is provided with parallel indentations 72 to receive a leg 72 of Z-bars 74 forming tracks for supporting the suspension members of the tray. The Z-bars are arranged in parallel relation adjacent the ends of the cover member with the web 75 of said Z-bars extending downwardly to space the leg 76 thereof from the cover liner, the leg 76 being turned outwardly toward the ends of the cover.

The Z-bars may be secured to the cover liner in any suitable manner, for example by cutting tabs 77 from the leg 73 and turning same upwardly for insertion through slots 78 in the indented portion of the cover liner, said tabs being folded over the upper face of the inner liner and pressed downwardly to press a portion of said liner indentation into the opening formed by the tabs as at 79. This provides a rigid structure thoroughly anchoring the track members to the cover liner. The suspension flanges 67 are adapted to slide in the space between the leg 76 and the cover liner. To provide resistance to such sliding whereby the tray will not move by itself and will remain in position on the cover when the cover is being removed from the cooler box, spring loops 80 are pressed upwardly in the lower legs 76 to apply spring pressure to the lower portion of the suspension flanges 67 to hold same in frictional engagement with the lower face of the cover liner. This structure allows the tray to be moved in the tracks to slide said tray to the side of the cover to provide access to the contents of the tray, yet the friction provided by the spring members 80 is sufficient to prevent free movement of the tray and hold same against movement as the cover is removed from the cooler box and the food carried to a place of consumption by the cover.

In using a cooler constructed as described, the bail is pushed to one side and over the side edge of the cover, whereby the handle 46 may be grasped to lift the cover from the cooler box. The food tray, being held in position on the cover, is also removed with said cover. The cap 32 is then tightened on the drain tube 24 and a suitable quantity of ice is placed in the lower portion of the cooler box and arranged on the bottom 23 of the inner shell whereby bottled beverage and other articles adapted for placing on the ice may be arranged in the cooler to obtain full benefit of the refrigeration imparted by the ice therein. The food tray is moved to one side of the cover whereby sandwiches and other dry foods may be placed in the tray as desired. The tray is then moved on the tracks formed by the Z-bars 74 to a central position and the cover lifted by the handle 46 to insert the food tray into the boundary of the inner shell 5 and seat the cover on the rib around the opening of the cooler box to close same. The bail is then swung upwardly over the cover to engage the handle and moved over the edges thereof to drop in the seat 48, providing spring pressure forcing the sloping edges of the cover liner into sealing engagement with the rib on the cooler box to seal the interior of said box, said bail securely locking the cover in place. The portable cooler is then ready for transportation to the point of use and may be lifted either by the handle 46 or bail 52 as desired, the arrangement of the bail facilitating the carrying of the container by two persons if considerable weight of material has been placed therein. If too much water has collected in the bottom of the inner shell, the cap 32 may be removed from the tubular drain member to allow a portion of the water to drain from the cooler, said cap being replaced to prevent any water from draining into the car or other means of transportation.

When it is desired to use any of the contents of the cooler, the bail is swung from engagement with the handle and over the side of the cooler whereby the cover may be lifted to expose the contents of the cooler. The food tray is lifted from the cooler simultaneously with the cover whereby either food or beverages may be obtained as desired.

It is believed obvious that I have provided a portable cooler structure of light weight, sturdy construction, capable of withstanding the abuses of transportation, and facilitating access to any of the contents of said cooler.

What I claim and desire to secure by Letters Patent is:

A portable cooler comprising, inner and outer shells, each having side, end and bottom walls, the respective walls of said shells being spaced apart, insulation in the spacing between the respective walls, interlocking flanges on the upper ends of the respective side and end walls to form a cooler box having an open top, said interlocking flanges forming an upstanding rib around the box opening, said upstanding rib being substantially in alignment with the walls of the inner shell, the inner shell of said box being adapted to contain ice and bottled beverages therein, and insulated cover having marginal portions overlying and adapted to seat on the upstanding rib for closing and sealing the cooler box opening, means for applying pressure to the cover for removably securing same in sealing engagement with the upstanding rib, a food tray adapted to be received within the interior of the cooler box, said food tray having bottom, side and end walls, a plurality of diagonal indented ribs in the end walls for stiffening same, parallel tracks secured to the bottom of the cover adjacent the ends thereof, flanges on the end walls of the tray slidably receivable in said tracks for removably securing the tray to the cover and position said tray in the upper portion of the cooler box, and indentures formed in the tracks for resiliently pressing the flanges on the tray end walls into frictional engagement with the cover for resisting relative movement between the tray and tracks.

GRANT M. ACTON.

REFERENCES CITED

The following references are of record in the file of this patent:

UNITED STATES PATENTS

| Number | Name | Date |
| --- | --- | --- |
| 1,986,155 | Mashburn | Jan. 1, 1935 |
| 2,087,413 | Ohme et al. | July 20, 1937 |